United States Patent
Kim et al.

(10) Patent No.: US 7,942,335 B2
(45) Date of Patent: May 17, 2011

(54) RADIO FREQUENCY SYSTEM AND PASSWORD MANAGEMENT METHOD IN RADIO FREQUENCY SYSTEM

(75) Inventors: Dae-youb Kim, Seoul (KR); Maeng-hee Sung, Seoul (KR); Weon-il Jin, Suwon-si (KR); Hwan-joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 11/474,305

(22) Filed: Jun. 26, 2006

(65) Prior Publication Data

US 2007/0051799 A1    Mar. 8, 2007

(30) Foreign Application Priority Data

Sep. 7, 2005    (KR) .................. 10-2005-0083172

(51) Int. Cl.
*G06K 19/06* (2006.01)
*G06K 5/00* (2006.01)
*G06K 7/08* (2006.01)
*G06F 17/00* (2006.01)

(52) U.S. Cl. ........ 235/492; 235/375; 235/382; 235/451; 726/5

(58) Field of Classification Search .................. 235/382, 235/382.5, 375, 451, 492; 340/10.3, 10.5, 340/5.21, 5.22, 5.26, 5.61, 5.74; 713/183, 713/184; 726/5

See application file for complete search history.

(56) References Cited

U.S. PATENT DOCUMENTS

| | | | |
|---|---|---|---|
| 7,321,300 B2 * | 1/2008 | Friedrich et al. | 340/539.11 |
| 7,646,300 B2 * | 1/2010 | Stewart et al. | 340/572.1 |
| 7,657,532 B2 * | 2/2010 | Murakami | 726/18 |
| 2001/0011355 A1 * | 8/2001 | Kawai | 713/202 |
| 2005/0027713 A1 * | 2/2005 | Cameron et al. | 707/100 |
| 2006/0230081 A1 * | 10/2006 | Craswell et al. | 707/204 |
| 2007/0008070 A1 * | 1/2007 | Friedrich | 340/10.1 |

* cited by examiner

*Primary Examiner* — Michael G Lee
*Assistant Examiner* — Suezu Ellis
(74) *Attorney, Agent, or Firm* — NSIP Law

(57) ABSTRACT

A radio frequency system and a password management method applied to a storage device of the radio frequency system are provided, in which a first access password is stored for deciding whether to permit access to information and a first changed password. The first changed password, a second access password, and a second changed password are received, and the first access password is changed to the second access password, and the first changed password is changed to the second changed password. Accordingly, information access authority in the storage device and a password change authority can be exclusively transferred according to the transfer of management of the storage device, and information leakage caused by a previous manager's password leakage or a third person's password leakage can be prevented.

27 Claims, 6 Drawing Sheets

US 7,942,335 B2

RADIO FREQUENCY SYSTEM AND PASSWORD MANAGEMENT METHOD IN RADIO FREQUENCY SYSTEM

This application claims the benefit under 35 U.S.C. §119(a) of Korean Patent Application No. 2005-83172, filed Sep. 7, 2005, in the Korean Intellectual Property Office, the entire disclosure of which is hereby incorporated by reference.

BACKGROUND OF THE INVENTION

1. Field of the Invention

The present invention relates to a radio frequency system and a password management method in the radio frequency system. More particularly, the present invention relates to a radio frequency system and a password management method in the radio frequency system using two types of passwords.

2. Description of the Related Art

A radio frequency system includes at least one storage device and at least one reader. Here, the storage device means a small-capacity storage device such as a smart card and a radio frequency identification (RFID) tag.

The smart card is a storage device that has a high security, high stability, and a mass storage capability, and its internal memory can be used in a divided manner. The smart card can be applied to diverse fields of services. Application fields using smart cards may include banking/settlement/distribution, information communication and mobile communication, medical welfare, access control, self-inspection of a meter, traffic fee collection, city complex card, and the like, and will be steadily extended in the future.

The RFID tag is a tag in the form of a thin plate that is typically read by an object in a non-contact manner through a radio signal. The RFID tag can be used in diverse application fields such as physical distribution, traffic, security, safety, and the like. Application services using the RFID tag may include a burglarproof device in a shopping center, security system such as speaking drugs for a blind person, forgery prevention device, animal tracking, vehicle safety device, private entrance/exit and access permission device, automatic fee collection system, production management, transport container freight tracking system, and the like. Also, the reader is a device that reads stored information by accessing a storage device as described above.

Here, the storage device requires the control of access and use of information stored in the storage device. That is, if access to information stored in the storage device is requested by an external reader, the storage device confirms whether an access authority for the information stored in the storage device exists in the reader that has requested the access, through the confirmation of the password transmitted from the reader.

Typically, the reader transmits a password required for accessing specified information to a storage device, and decides whether to permit access to the specified information of the reader through a process for confirming whether the transmitted password coincides with the password stored in the storage device.

However, as described above, the storage device may be a tag, which may be attached to a product that is circulated in the market. In this case, the corresponding product may be managed by different managers according to distribution stages and the respective managers attempt to access the storage device attached to the product through readers held by the respective managers.

According to a method for providing an authority to access information in a storage device to managers at respective distribution stages, a password for accessing information in the storage device can be shared by the respective managers. In this case, however, the corresponding password may leak. Also, previous managers who have no authority to manage the product any more can still access the information in the storage device by the previously allocated password.

Accordingly, there is a need for an improved radio frequency system that includes a password management method for accessing information in a storage device and preventing password leaks.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a radio frequency system and a password management method in the radio frequency system using two types of passwords.

The foregoing and other objects and advantages are implemented realized by providing a password management method in a radio frequency system applied to a storage device of the radio frequency system for storing a first access password that decides whether to permit access to information and a first changed password, according to an exemplary embodiment of the present invention, in which the first changed password, a second access password, and a second changed password is received when changing a password of the storage device is required due to a change of ownership of the storage device and the like; and the first access password is changed to the second access password, and the first changed password is changed to the second changed password.

In an exemplary implementation, the access to the information stored in the storage device is permitted when the second access password is received after the password change.

According to another aspect of exemplary embodiments of the present invention, there is provided a storage device in a radio frequency system for storing a first access password that decides whether to permit access to information and a first changed password, in which a receiving unit receives the first changed password, a second access password, and a second changed password when changing a password of the storage device is required due to a change of ownership of the storage device and the like; and a password management unit changes the first access password to the second access password, and the first changed password to the second changed password when the receiving unit receives the first changed password, the second access password, and the second changed password.

In an exemplary implementation, an access decision unit permits the access to the information stored in the storage device itself when the second access password is received after the password change.

According to still another aspect of exemplary embodiments of the present invention, there is provided a radio frequency system that uses a first access password that decides whether to permit access to information and a first changed password, in which a reader transmits the first changed password, a second access password, and a second changed password to a storage unit when changing a password of the storage device is required due to a change of ownership of the storage device and the like; and the storage device changes the first access password to the second access password, and the first changed password to the second changed password when the first changed password, the second access password, and the second changed password are received from the reader.

In an exemplary implementation, the storage device may permit access to the information stored in the storage device when the second access password is received after the password change.

According to still another aspect of exemplary embodiments of the present invention, there is provided a password management method in a radio frequency system, applied to a reader of the radio frequency system that uses a first access password for deciding whether to permit access to information and a first changed password, in which a serial number of the storage device is received, the serial number of the storage device is transmitted to a directory server which stores a uniform resource locator (URL) of an information server that stores information corresponding to the serial number, the first access password, and the first changed password, the URL of the information server is received, which stores the information corresponding to the serial number, from the directory server, the first changed password, a second access password, and a second changed password is transmitted using the URL, and the information server changes the first access password to the second access password, and the first changed password to the second changed password.

In an exemplary implementation, the serial number and the second access password is transmitted after the password change, using the URL, and access permission to the information is received corresponding to the serial number.

In another exemplary implementation, the transmitting of the serial number and the second access password using the URL may comprise transmitting an access request signal to the information server and receiving a random number, and transmitting the serial number and a value obtained by substituting the random number and the first access password in a one-way hash function to the information server.

In still another exemplary implementation, the transmitting of the serial number and the second access password using the URL may comprise transmitting an access request signal and the serial number to the information server and receiving a random number, and transmitting a value obtained by substituting the random number and the first access password in a one-way hash function to the information server.

In an exemplary implementation, the transmitting of the serial number and the first access password using the URL may comprise transmitting the serial number, a transmission time, and a value obtained by substituting the serial number, the transmission time, and the first access password in a one-way hash function to the information server.

In a further exemplary implementation, the transmitting of the first changed password, the second access password, and the second changed password may comprise transmitting a password change request signal to the information server and receiving a random number, transmitting the serial number and a value obtained by substituting the random number and the first changed password in a one-way hash function, and transmitting the second access password and the second changed password.

According to still another aspect of exemplary embodiments of the present invention, there is provided a radio frequency system that includes an information server, at least one reader, and at least one storage device, and uses a first access password for deciding whether to permit access to information and a second changed password, in which a receiving unit receives a serial number of the storage device, and a transmitting unit transmits the serial number to a directory server which stores a uniform resource locator (URL) of an information server that stores information corresponding to the serial number, the first access password, and a first changed password, wherein as the receiving unit receives the URL of the information server, which stores the information corresponding to the serial number, from the directory server, the transmitting unit transmits the serial number, the first changed password, a second access password, and the second changed password to the information server using the URL when it is required to change a password of the storage device due to a change of ownership of the storage device, and the information server changes the first access password to the second access password, and changes the first changed password to the second changed password.

In an exemplary implementation, the transmitting unit may transmit an access request signal to the information server, the receiving unit may receive a random number, and the transmitting unit may transmit the serial number and a value obtained by substituting the random number and the first access password in a one-way hash function to the information server.

In another exemplary implementation, the transmitting unit may transmit an access request signal and the serial number to the information server, the receiving unit may receive a random number, and the transmitting unit may transmit a value obtained by substituting the random number and the first access password in a one-way hash function to the information server.

In still another exemplary implementation, the transmitting unit may transmit the serial number, a transmission time, and a value obtained by substituting the serial number, the transmission time, and the first access password in a one-way hash function to the information server.

According to still another aspect of exemplary embodiments of the present invention, there is provided a password management method in a radio frequency system that includes at least one reader, at least one storage device, and an information server which stores information corresponding to a serial number of the storage device, a first access password, and a first changed password, in which comprises the serial number, the first changed password, a second changed password, and a second access password are received when changing a password of the storage device is required due to a change of ownership of the storage device and the like; and the first access password is changed to the second access password, and the first changed password is changed to the second changed password.

In an exemplary implementation, the serial number and the second access password are received after the password change, and access to information corresponding to the serial number is permitted.

In another exemplary implementation, an access request signal is received and a random number is transmitted, and the serial number and a value obtained by substituting the random number and the second access password in a one-way hash function are received.

In still another exemplary implementation, an access request signal and the serial number are received, and a random number is transmitted, and a value obtained by substituting the random number and the second access password in a one-way hash function are received.

In a further exemplary implementation, the serial number, a transmission time, and a value obtained by substituting the serial number, the transmission time, and the second access password in a one-way hash function are received.

According to still another aspect of exemplary embodiments of the present invention, there is provided a radio frequency system including at least one reader, at least one storage device, and an information server that stores information corresponding to a serial number of the storage device, a first access password, and a first changed password, in which comprises a transmitting/receiving unit receives the serial number, the first changed password, a second changed password, and a second access password when changing a password of the storage device is required due to a change of ownership of the storage device and the like; and a password management unit changes the first access password to the second access password and changing the first changed password to the second changed password when the transmitting/receiving unit receives the serial number, the first changed password, the second changed password, and the second access password.

In an exemplary implementation, the radio frequency system may further comprise an access decision unit for deciding whether to permit access to information corresponding to the serial number when the transmitting/receiving unit receives the serial number and the second access password after the password change.

In another exemplary implementation, the transmitting/receiving unit may receive an access request signal, transmit a random number, and receive the serial number and a value obtained by substituting the random number and the second access password in a one-way hash function.

In still another exemplary implementation, the transmitting/receiving unit may receive an access request signal and the serial number, transmit a random number, and receive a value obtained by substituting the random number and the second access password in a one-way hash function.

In a further exemplary implementation, the transmitting/receiving unit may receive the serial number, a transmission time, and a value obtained by substituting the serial number, the transmission time, and the second access password in a one-way hash function.

In an exemplary implementation, The transmitting/receiving unit may receive a password change request signal, transmit a random number, receive the serial number and a value obtained by substituting the random number and the first changed password in a one-way hash function, and receive the second access password and the second changed password.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention are characterized in that a person who has taken over an access authority to information in a storage device uses two types of passwords in order to eliminate accesses of the previous rightful persons.

The first type of password is used to receive access permission to the information in the storage device, and the second type of password is required for receiving an authentication of a right to change the first type of password as described above. If the authentication of an access is made through the second type of password, it becomes possible to change not only the first type of password, but also the second type of password.

In the following description, the first type of password is called an access password (AP) and the second type of password is called a changed password (CP).

In an exemplary implementation, both the access password (AP) and the changed password (CP) can be changed by the changed password (CP).

Figure 1A:
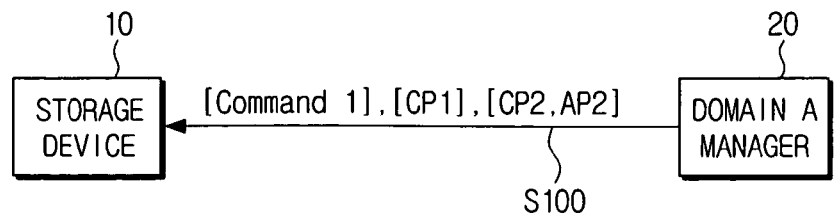
FIG. 1A is a view explaining a password changing process in domain A according to an exemplary embodiment of the present invention.

FIG. 1A is a view explaining a password changing process in domain A according to an exemplary embodiment of the present invention.

In an exemplary implementation, a storage device 10 may be a small-capacity storage device having calculation and communication functions such as an RFID tag, and should store two or more passwords.

The storage device 10 according to an exemplary embodiment of the present invention includes a receiving unit for receiving passwords that are transmitted from a reader, a password management unit for managing change and storage of the passwords, and an access decision unit for deciding whether to permit access to information.

The storage unit 10 authenticates the password transmitted from outside, identifies accessible information according to the password, and transmits the requested information. In an exemplary implementation, the password stored in the storage device 10 should be protected from being directly accessed from outside.

In the storage device 10, a first access password and a first changed password are stored as basic set values. Typically, the first access password and the first changed password are set by a manufacturer in the manufacturing process of the storage device 10. The first access password and the first changed password are transferred from the manufacturer to a manager 20 of domain A.

When the password of the storage device 10 intends to be changed, the manager 20 of domain A transmits the first changed password, a second changed password, and a second access password to the storage device 10 using its reader, and commands a password change (S100).

The storage device 10 confirms whether the first changed password stored as a basic set value coincides with the transmitted first changed password. If the first changed password coincides with the transmitted first changed password, the storage device 10 changes the first changed password and the first access password to the second changed password and the second access password, respectively, to store the changed passwords. In an exemplary implementation, the first changed password and the first access password that are previous passwords are deleted from the storage device 10.

In an exemplary embodiment of the present invention, the manager of domain A may be a seller of a product to which a storage device 10 is attached, and the authority to access data in the storage device 10 and change the password is transferred from the manufacture to the manager of domain A through the above-described password changing process.

That is, through the above-described password changing process, the manufacturer becomes unable to access the data in the storage device 10 or change the password.

It is preferable that the change of the password is performed in a safe local place where its wiretapping is impossible. Thereafter, the manager 20 of domain A can control whether to permit access to the storage device by providing the second access password required for accessing the storage device 10 in accordance with the domain management policy.

Figure 1B:
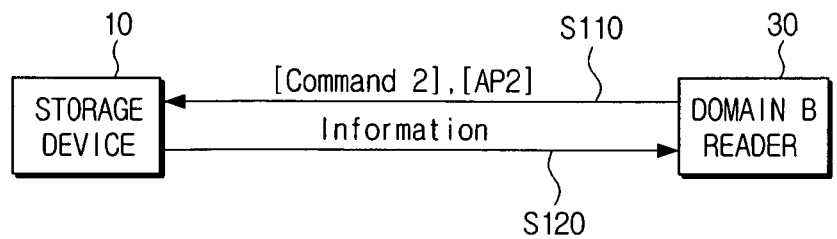
FIG. 1B is a view explaining an information access process in a storage device according to an exemplary embodiment of the present invention.

FIG. 1B is a view explaining an information access process in a storage device according to an exemplary embodiment of the present invention. A reader 30 of domain B in FIG. 1B is a reader possessed by a member of domain B.

The manager 20 of domain A has provided the second access password that is the changed password to the member of domain B. Thus, the member of domain B has stored the provided second access password in the reader 30 of domain B. The storage of the provided password in the reader 30 of the domain B may be performed by an automatic input using an access password transmitting device, or by a manual input of the member of domain B. In an automatic input, it is preferable to use a safe communication channel such as a short-range infrared communication in which the wiretapping is difficult.

In an exemplary embodiment of the present invention, the manager 20 of domain A may be a seller of a product to which a storage device is attached, and the member of domain B may be a purchaser of the product to which the storage device is attached.

Referring to FIG. 1B, a process of accessing information in the storage device 10 according to an exemplary embodiment of the present invention will be explained. First, the reader 30 of domain B transmits the second access password to the storage device 10 to request access to desired information (S110).

In an exemplary implementation, the storage device 10 confirms whether the transmitted second access password coincides with the second access password stored in the storage device itself. If the transmitted second access password coincides with the stored second access password, the storage device 10 transmits access information, which is permitted by the transmitted second access password (S1120).

Although the reader 30 of domain B can access the information in the storage device 10 through the above-described process, even the manager 20 of domain A has the second access password. Thus, it is also possible for a third person who has received the second access password from the manager 20 of domain A, in addition to the manager 20 of domain A, to access the information in the storage device 10.

Also, since the manager 20 of domain A still has the second changed password, the second access password, which is the present password in the storage device 10, may be changed to another password using the second changed password. Accordingly, the change may cause an access authority of the reader 30 of domain B to be divested.

In order to eliminate the above-described possibility and secure stable access to the information in the storage device 10 of the reader 30 of domain B, the following process will be required.

Figure 1C:
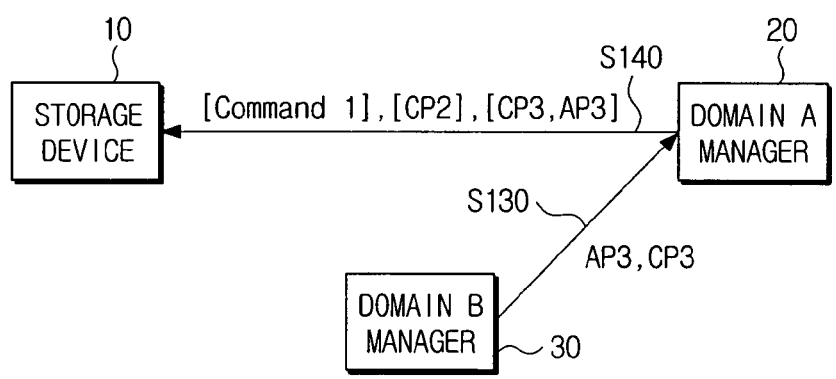
FIG. 1C is a view explaining a password changing process according to a request of domain B according to an exemplary embodiment of the present invention.

FIG. 1C is a view explaining a password changing process according to a request of domain B according to an exemplary embodiment of the present invention.

Referring to FIG. 1C, the reader 30 of domain B transmits a third changed password that will be used as a new password by the reader itself and a third access password to the reader of the manager 20 of domain A (S130), and then stores the changed passwords.

The transmission of the password in step S130 may be performed by an automatic input using a password transmitting device. In an exemplary implementation, it is preferable to use a safe communication channel such as a short-range infrared communication in which the wiretapping is difficult.

The manager 20 of domain A transmits the second changed password, the third changed password, and the third access password to the storage device 10 using its reader, and then commands the password change (S140).

Then, the storage device 10 confirms whether the second changed password stored in the storage device itself coincides with the transmitted second changed password. If the stored second changed password coincides with the transmitted second changed password, the storage device 10 changes the second change password and the second access password to the third changed password and the third access password, respectively, to store the changed passwords. In an exemplary implementation, the second changed password and the second access password, which are the previous passwords, are deleted from the storage device 10.

In an exemplary embodiment of the present invention, the manager 20 of domain A should not store the third changed password and the third access password, and should not expose the passwords to outside.

Through the above-described steps S130 and S140, the reader 30 of domain B secures the exclusive password change and access authorities with respect to the storage device 10.

In an exemplary embodiment of the present invention, where a member of domain B who possesses the reader 30 of the domain B decides that it is required to change the password (due to the exposure of the password to outside and the like), he/she may perform the following password changing process using the third changed password.

Figure 1D:
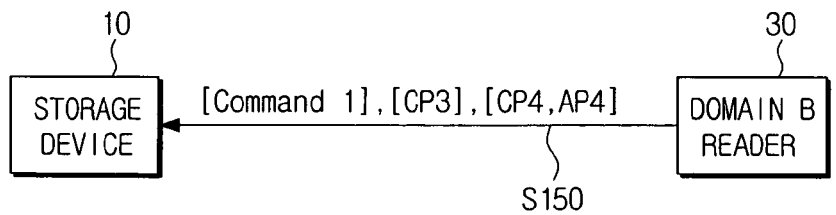
FIG. 1D is a view explaining a password changing process in domain B according to an exemplary embodiment of the present invention.

FIG. 1D is a view explaining a password changing process in domain B according to an exemplary embodiment of the present invention. Referring to FIG. 1D, the domain B reader 30 transmits the third changed password, a fourth changed password and a fourth access password to the storage device 10, and commands the password change (S150).

Then, the storage device 10 confirms whether the third changed password stored in the storage device itself coincides with the transmitted third changed password. If the stored third changed password coincides with the transmitted third changed password, the storage device 10 changes the third change password and the third access password to the fourth changed password and the fourth access password, respectively, to store the changed passwords. In this case, the third changed password and the third access password, which are the previous passwords, are deleted from the storage device 10.

Figure 1E:
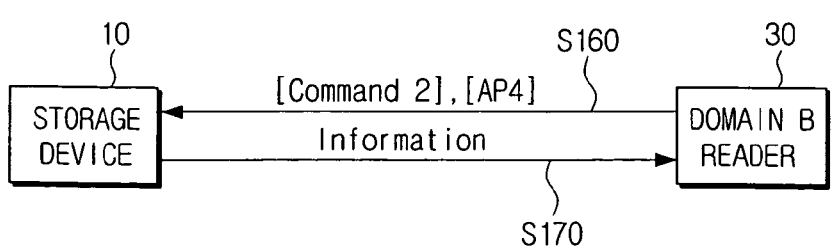
FIG. 1E is a view explaining an information access process in a storage device according to an embodiment of the present invention.

FIG. 1E is a view explaining an information access process in a storage device according to an exemplary embodiment of the present invention.

Referring to FIG. 1E, the information access process in the storage device according to an exemplary embodiment of the present invention will be explained. First, the reader 30 of domain B transmits the fourth access password to the storage device 10, and requests access to desired information (S160).

In an exemplary implementation, the storage device 10 confirms whether the received fourth access password coincides with the fourth access password stored in the storage device itself. If the received fourth access password coincides with the stored fourth access password, the storage device 10 transmits access information, which is permitted by the received fourth access password (S170).

On the other hand, in the radio frequency system according to an exemplary embodiment of the present invention, the storage device stores information on the storage device and information on a product where the storage device is attached to the product. However, according to the environment and condition where the present invention is performed, it is required that the storage device is small. In an exemplary implementation, a large amount of information cannot be stored in the storage device.

In an exemplary embodiment of the present invention, it may be required that the storage device stores minimum information corresponding to its serial number, and detailed information on the storage device and the product to which the storage device is attached is stored in an external server connected through the network.

Figure 2:
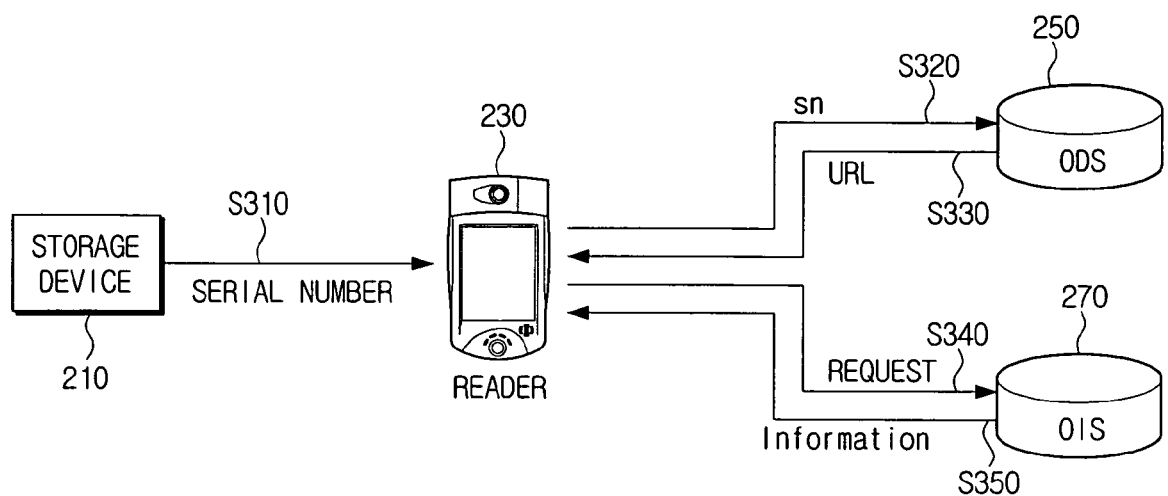
FIG. 2 is a view illustrating a network structure according to an exemplary embodiment of the present invention.

FIG. 2 is a view illustrating a network structure according to an exemplary embodiment of the present invention.

The network structure according to an exemplary embodiment of the present invention includes a storage device 210, reader 230, object directory server 250, and object information server 270.

The storage device 210 stores its serial number, and transmits its serial number to the reader 230.

The reader 230 receives the serial number of the storage device 210, and requests access to information corresponding to the serial number to the information server 270. In an exemplary implementation, the reader 230 includes a receiving unit for receiving information signals from the storage device 210, the directory server 250, and the information server 270, and a transmitting unit for transmitting signals to the storage device 210, the directory server 250, and the information server 270.

The information server 270 stores serial numbers of the storage devices 210 and information corresponding to the serial numbers. The directory server 250 stores a uniform resource locator (URL) of the information server 270 that stores the information corresponding to the serial numbers of the storage devices 210.

In addition, if an access request is received from the reader 230, the information server 270 stores access passwords and changed passwords required for deciding whether to permit access to the information corresponding to the serial numbers of the respective storage devices 210.

The information server 270 includes a transmitting/receiving unit for receiving the request signal, serial number, and password from the reader, a password management unit for managing the change and storage of the passwords, and an access decision unit for deciding whether to permit access to the information corresponding to the serial number.

Referring to FIG. 2, the operation of the network construction according to an exemplary embodiment of the present invention will be explained. First, the reader 230 receives the serial number from the storage device 210 (S310), and stores the serial number in its storage unit (not illustrated). In an exemplary embodiment of the present invention, however, the serial number of the storage device 210 may be inputted by a user of the reader 230.

In order to access the information corresponding to the serial number of the storage device 210, the reader 230 transmits the serial number to the directory server 250 that stores the URL of the information server 270 corresponding to the respective serial number, and then receives the URL of the information server 270 that stores the information corresponding to the serial number (S320).

The directory server 250, which has received the serial number, confirms the URL of the information server 270 that stores the information corresponding to the serial number, and transmits the confirmed URL to the reader 230 (S330).

The reader 230, which has received the URL, transmits the serial number of the storage device 210 and the first access password required for accessing the information corresponding to the serial number to the information server 270, and requests access to the corresponding information (S340). In an exemplary embodiment of the present invention, if the serial number corresponds to the first access password required for accessing the information corresponding to the serial number in a one-to-one manner, the reader can request access to the corresponding information by the transmission of the first access password.

The information server 270 receives the serial number and the first access password from the reader 230, confirms whether the first access password corresponding to the serial number stored therein coincides with the transmitted first access password. If the stored first access password coincides with the transmitted first access password, the information server 270 transmits the information corresponding to the serial number to the reader 230 (S350).

However, since the directory server 250 and the information server 270 according to an exemplary embodiment of the present invention are constructed on the network, the serial number and the password may leak while they are transmitted to the reader 230. Accordingly, in order to prevent a third person's fraudulent use of the serial number and the password, it is preferable that the above-described step S340 is performed by the following methods.

Figure 3A:
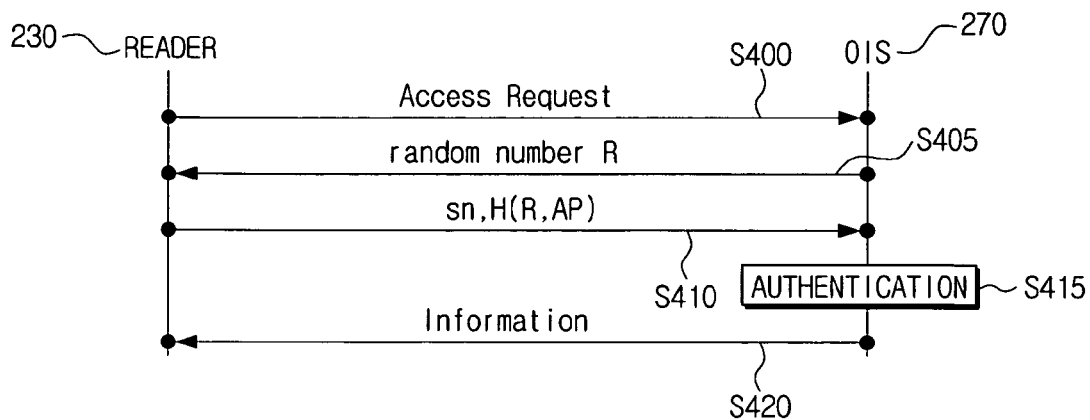
FIGS. 3A to 3C are views explaining methods for requesting access to an information server on a network according to an exemplary embodiment of the present invention.
Figure 3B:
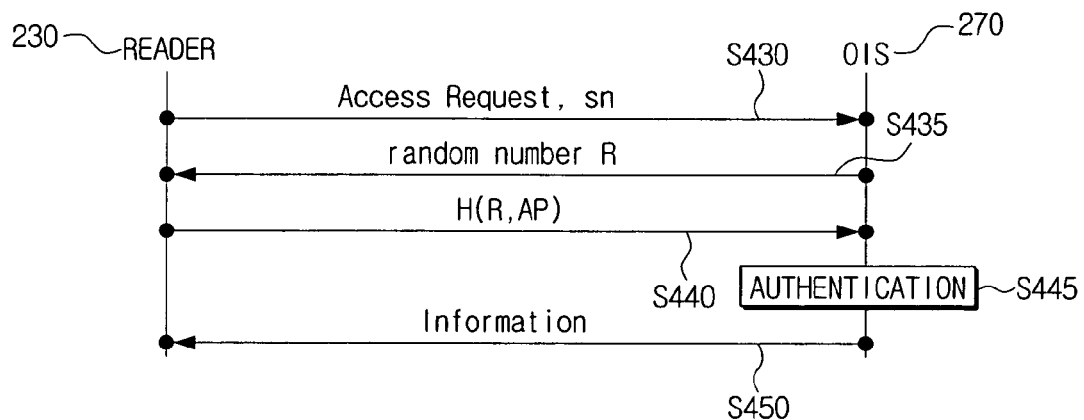
Figure 3C:
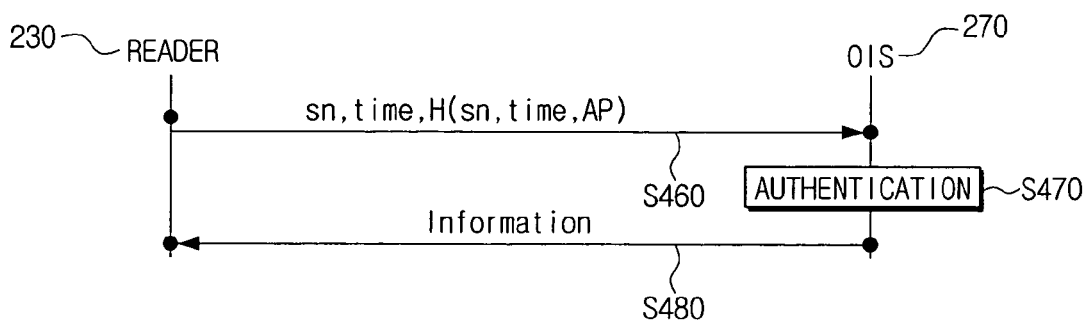

FIGS. 3A to 3C are views explaining methods for requesting access to an information server on a network according to an exemplary embodiment of the present invention. Hereinafter, the methods for requesting access to an information server on a network will be explained with reference to FIGS. 3A to 3C.

Referring to FIG. 3A, in transmitting the serial number of the storage device 230 and the first access password using the received URL, the reader 230 first transmits an access request signal to the information server 270 (S400).

The information server 270, which has received the access request signal from the reader 230, transmits a random number that has been randomly extracted to the reader 230 (S405), and the reader 230 transmits the serial number and a value obtained by substituting the received random number and the first access password in a one-way hash function to the information server (S410).

Here, the one-way hash function is a function for compressing an input value of a certain length into an output value of a fixed length, and has the following properties. In the one-way hash function, it is impossible to calculate and obtain an input value with respect to a given output value, and it is also impossible to calculate and find another input value that provides the same output with respect to a given input value. Also, in the one-way hash function, it is impossible to calculate and find two different input values that provide the same output value.

The one-way hash function that satisfies the above-described properties is one of important functions applied for data integrity, authentication, non-repudiation, and the like. In an exemplary embodiment of the present invention, the reader 230 and the information server 270 will share the one-way hash function.

Then, the information server 270 authenticates the access to the information of the corresponding reader 230 through the transmitted one-way hash function value (S415), and transmits the information corresponding to the serial number, which has been requested by the reader 230 (S420).

Referring to FIG. 3B, in transmitting the serial number of the storage device 230 and the first access password using the received URL, the reader 230 first transmits an access request signal and the serial number of the storage device 210 to the information server 270 (S430). Accordingly, the information server 270 transmits a random number R that has been randomly extracted to the reader (S435).

Then, the reader 230 transmits a value obtained by substituting the received random number and the first access password in the above-described one-way hash function to the information server. Accordingly, the information server 270 authenticates the access to the information of the corresponding reader 230 through the transmitted one-way hash function value (S445), and transmits the information corresponding to the serial number, which has been requested by the reader 230 (S450).

Referring to FIG. 3C, in transmitting the serial number of the storage device 230 and the first access password using the received URL, the reader 230 may first transmit the serial number of the storage device 210, present transmission time, and a value obtained by substituting the serial number, the transmission time, and the first access password in the one-way hash function to the information server 270 (S460).

Accordingly, the information server 270 authenticates the access to the information of the corresponding reader 230 through the transmitted one-way hash function value (S470). Here, the transmission time transmitted by the reader has the same role as the random number as illustrated in FIGS. 3A and 3B. Accordingly, whether to permit the access is decided. Then, the information server 270 transmits the information corresponding to the serial number, which has been requested by the reader 230 (S480).

Referring again to FIG. 2, it may be required for the reader 230 to change the password for the corresponding storage device 210. The required password change may be caused by the exposure of the password, and in changing the password, the reader 230 transmits the first changed password, the second access password, and the second changed password to the information server 270 using the URL received from the directory server 250.

Then, the information server 270 confirms whether the received first changed password coincides with the first changed password stored in the information server itself. If the received first changed password coincides with the stored first changed password, the information server 270 stores the second access password and the second changed password. In an exemplary implementation, the first access password and the first changed password are deleted from the information server 270.

Then, in requesting access to the information server 270, the reader 230 transmits the serial number and the changed second access password using the URL of the information server 270 (S340). Accordingly, the information server 270 receives the serial number and the second access password from the reader 230, and confirms whether the second access password corresponding to the serial number stored in the information server itself coincides with the received second access password. If the stored second access password coincides with the received second access password, the information server transmits the information corresponding to the serial number to the reader 230 (S350).

However, since the directory server 250 and the information server 270 according to an exemplary embodiment of the present invention are constructed on the network, the serial number and the password may leak while they are transmitted to the reader 230. Accordingly, in order to prevent a third person's fraudulent use of the serial number and the password, it is preferable that the above-described password changing process is performed by the following methods.

Figure 4:
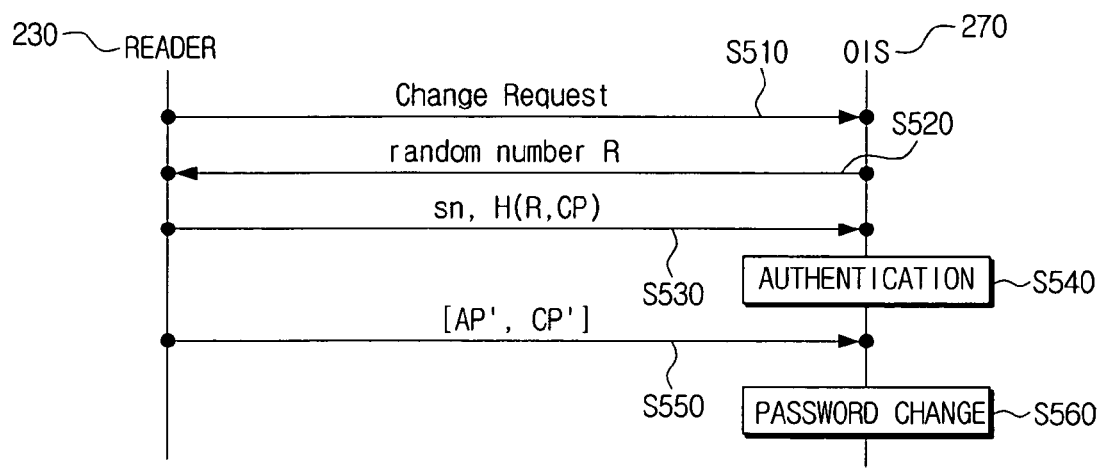
FIG. 4 is a view explaining a method for requesting a password change to an information server on a network according to an exemplary embodiment of the present invention.

FIG. 4 is a view explaining a method for requesting a password change to an information server on a network according to an exemplary embodiment of the present invention.

Referring to FIG. 4, in requesting the password change to the information server 270, the reader 210 first transmits a password change request signal to the information server 270 (S510). The information server 270 transmits a random number R that has been randomly extracted to the reader 230 (S520), and the reader 230, which has received the random number, transmits the serial number of the corresponding storage device 210 and a value obtained by substituting the random number and the first changed password in the one-way hash function to the information server (S530).

Then, the information server 270 authenticates the password change authority of the corresponding reader 230 through the received one-way hash function (S540), and the reader 230 transmits the second changed password and the second access password that are changed passwords to the information server 270 (S550). In an exemplary embodiment of the present invention, the reader 230 may transmit the second changed password and the second access password that are changed passwords to the information server 270 after receiving the authentication signal from the information server 270 in step S540.

The information server 270 changes the stored passwords to the second changed password and the second access password (S560), and deletes the first changed password and the first access password.

In the network structure according to an exemplary embodiment of the present invention as described above with reference to FIGS. 3A to 3C, and FIG. 4, if the access request is received from the reader 230, the information server 270 stores the access password and the changed password required for deciding whether to permit access to the information corresponding to the serial number of the respective storage device 210.

In an exemplary embodiment of the present invention, however, the directory server 250 may store the access password and the changed password required for deciding whether to transmit the URL of the information server 270 that stores the information corresponding to the serial number of the respective storage device 210 when the URL request is received from the reader 230.

The information server 270 according to an exemplary embodiment of the present invention includes a transmitting/receiving unit for receiving the request signal, serial number, and password from the reader, a password management unit for managing the change and storage of the passwords, and a URL transmission decision unit for deciding whether to transmit the URL of the information server that stores the information corresponding to the serial number.

Referring again to FIG. 2, the operation of the network construction according to an exemplary embodiment of the present invention will be explained. First, the reader 230 receives the serial number from the storage device 210 (S310), and stores the serial number in its storage unit (not illustrated). In an exemplary embodiment of the present invention, however, the serial number of the storage device 210 may be inputted by a user of the reader 230.

Then, in order to access the information corresponding to the serial number of the storage device 210, the reader 230 transmits the serial number and the first access password to the directory server 250 that stores the URL of the information server 270, the first access password, and the first changed password, and then receives the URL of the information server 270 that stores the information corresponding to the serial number (S320).

In an exemplary embodiment of the present invention, if the serial number corresponds to the first access password required for receiving the URL of the information server 270 that stores the information corresponding to the serial number in a one-to-one manner, the reader can request the transmission of the corresponding URL by the transmission of the first access password.

The directory server 250 confirms whether the transmitted first access password coincides with a pre-stored first access password. If the transmitted first access password coincides with the pre-stored first access password, the directory server 250 transmits the URL of the information server that stores the information corresponding to the serial number (S330).

The reader 230 transmits the serial number of the corresponding storage device 210 to the information server 270 using the received URL (S340).

The information server 270 transmits the information corresponding to the received serial number to the reader 230 (S350).

However, since the directory server 250 and the information server 270 according to an exemplary embodiment of the present invention are constructed on the network, the serial number and the password may leak while they are transmitted to the reader 230. Accordingly, in order to prevent a third person's fraudulent use of the serial number and the password, it is preferable that the above-described step S320 is performed by the following methods.

Figure 5A:
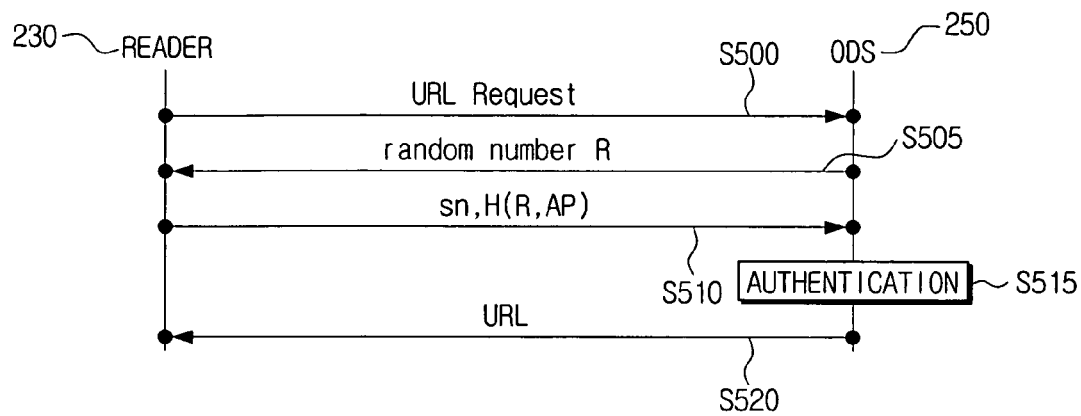
FIGS. 5A to 5C are views explaining methods for requesting an URL to a directory server on a network according to an exemplary embodiment of the present invention.
Figure 5B:
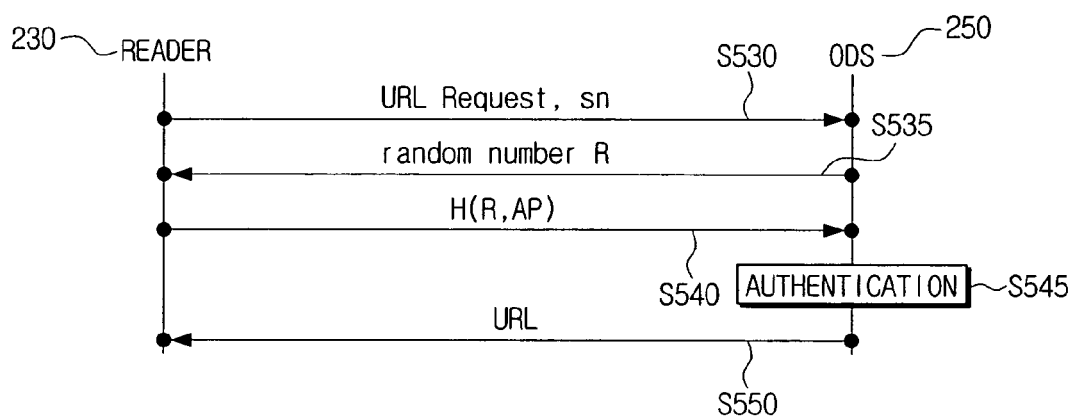
Figure 5C:
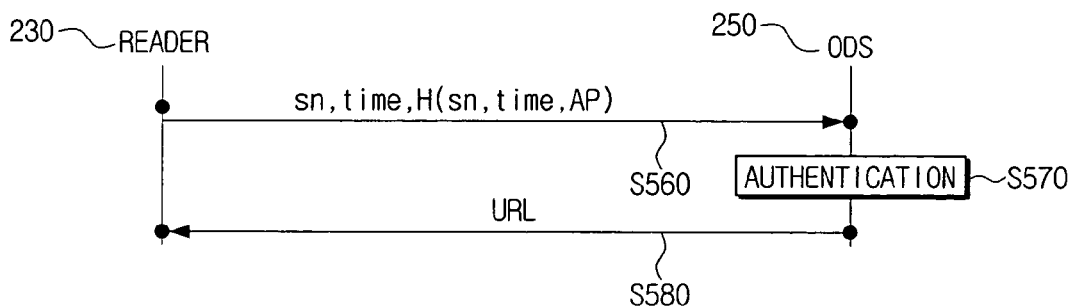

FIGS. 5A to 5C are views explaining methods for requesting a URL to a directory server on a network according to an exemplary embodiment of the present invention. Hereinafter, the methods for requesting a URL to the directory server on the network will be explained with reference to FIGS. 5A to 5C.

Referring to FIG. 5A, in requesting the URL to the directory server 250, the reader 230 first transmits a URL request signal to the directory server 250 (S500).

The directory server 250, which has received the URL request signal from the reader 230, transmits a random number that has been randomly extracted to the reader 230 (S505), and the reader 230 transmits the serial number and a value obtained by substituting the received random number and the first access password in a one-way hash function to the directory server 250 (S510).

In an exemplary embodiment of the present invention, the reader 230 and the directory server 250 will share the one-way hash function.

Then, the directory server 250 authenticates the access to the information of the corresponding reader 230 through the transmitted one-way hash function value (S515), and transmits the information corresponding to the serial number, which has been requested by the reader 230 (S520).

Referring to FIG. 5B, in requesting the URL to the directory server 250, the reader 230 first transmits a URL request signal and the serial number of the storage device 210 to the directory server 250 (S530). Accordingly, the directory server 250 transmits a random number R that has been randomly extracted to the reader (S535).

Then, the reader 230 transmits a value obtained by substituting the received random number and the first access password in the above-described one-way hash function to the directory server 250. Accordingly, the directory server 250 authenticates the access to the information of the corresponding reader 230 through the transmitted one-way hash function value (S545), and transmits the information corresponding to the serial number, which has been requested by the reader 230 (S550).

Referring to FIG. 5C, in requesting the URL to the directory server 250, the reader 230 may transmit the serial number of the storage device 210, the present transmission time, and a value obtained by substituting the serial number, the transmission time, and the first access password in the one-way hash function to the directory server 250 (S560).

Accordingly, the directory server 250 authenticates the access to the information of the corresponding reader 230 through the transmitted one-way hash function value (S570). Here, the transmission time transmitted by the reader has a similar role as the random number illustrated in FIGS. 5A and 5B. Accordingly, whether to permit the access is decided. Then, the directory server 250 transmits the information corresponding to the serial number, which has been requested by the reader 230 (S580).

Referring again to FIG. 2, it may be required for the reader 230 to change the corresponding password. As described above, this may be caused by the exposure of the password. In changing the password, the reader 230 transmits the first changed password, the second access password, and the second changed password to the directory server 250.

Then, the directory server 250 confirms whether the received first changed password coincides with the first changed password stored in the directory server. If the received first changed password coincides with the stored first changed password, the directory server 250 stores the second access password and the second changed password. In this case, the first access password and the first changed password are deleted from the directory server 250.

Then, in requesting the URL to the directory server 250, the reader 230 transmits the serial number and the changed second access password (S320). Accordingly, the directory server 250 receives the serial number and the second access password from the reader 230, and confirms whether the second access password corresponding to the serial number stored in the directory server itself coincides with the received second access password. If the stored second access password coincides with the received second access password, the directory server transmits the URL of the information server 270 that stores the information corresponding to the serial number (S330).

The reader 230 transmits the serial number of the storage device 210 to the information server 270 using the received URL (S340), and the information server 270, which has received the serial number, transmits the information corresponding to the serial number (S350).

However, since the directory server 250 and the information server 270 according to an exemplary embodiment of the present invention are constructed on the network, the serial number and the password may leak while they are transmitted to the reader 230. Accordingly, in order to prevent a third person's fraudulent use of the serial number and the password, it is preferable that the above-described password changing process is performed by the following method.

Figure 6:
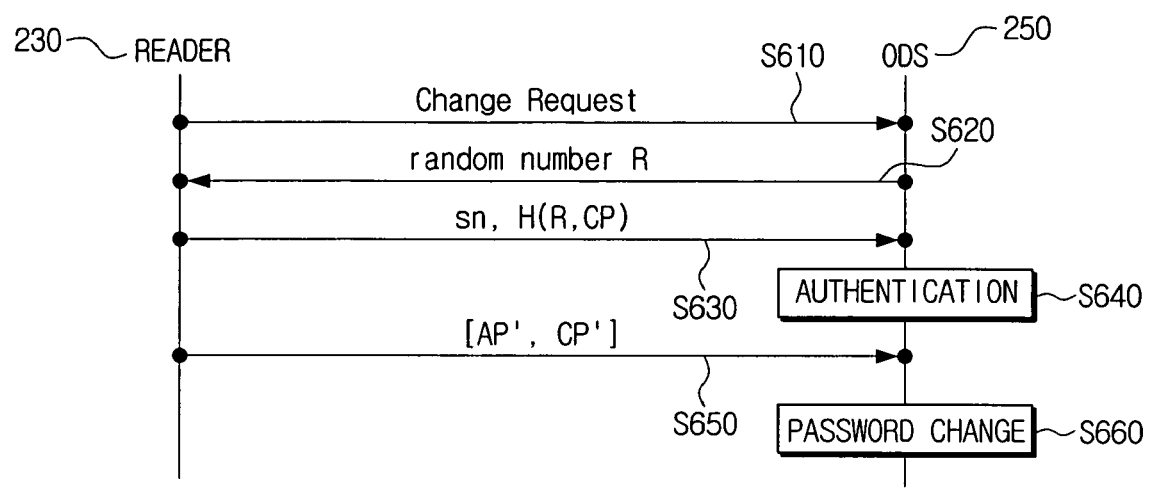
FIG. 6 is a view explaining a method for requesting a password to a directory server on a network according to an exemplary embodiment of the present invention.

FIG. 6 is a view explaining a method for requesting a password to a directory server on a network according to an exemplary embodiment of the present invention.

Referring to FIG. 6, in requesting the password change to the directory server 250, the reader 210 first transmits a password change request signal to the directory server 250 (S610). The directory server 250 transmits a random number R that has been randomly extracted to the reader 230 (S620). The reader 230, which has received the random number, transmits the serial number of the corresponding storage device 210 and a value obtained by substituting the random number and the first changed password in the one-way hash function to the directory server (S630).

Then, the directory server 250 authenticates the password change authority of the corresponding reader 230 through the received one-way hash function (S640), and the reader 230 transmits the second changed password and the second access password that are the changed passwords to the directory server 250 (S650). In an exemplary embodiment of the present invention, the reader 230 may transmit the second changed password and the second access password that includes the changed passwords to the directory server 250 after receiving the authentication signal from the directory server 250 in step S640.

The information server 270 changes the stored passwords to the second changed password and the second access password (S660), and deletes the first changed password and the first access password.

As described above, according to exemplary embodiments of the present invention, the information access authority in the storage device and the password change authority can be exclusively transferred according to the transfer of management of the storage device, and the information leakage caused by a previous manager's password leakage or a third person's password leakage can be prevented.

While the invention has been shown and described with referent to certain exemplary embodiments thereof, it will be understood by those skilled in the art that various changes in form and details may be made therein without departing from the spirit and scope of the invention as defined by the appended claims.

What is claimed is:

1. A password management method of a radio frequency identification (RFID) storage device included in a radio frequency system, the password management method comprising:
storing a first access password corresponding to permission to access information stored in the RFID storage device and a first changed password corresponding to authentication of a right to change the first access password;
receiving the first changed password, a second access password, and a second changed password; and
changing the first access password to the second access password and changing the first changed password to the second changed password, when the RFID storage device confirms that the received first changed password is the same as the stored first changed password.

2. The password management method as claimed in claim 1, further comprising permitting a reader access to information stored in the RFID storage device when the second access password is received from the reader.

3. An RFID storage device in a radio frequency system, for storing a first access password corresponding to permission to access information stored in the RFID storage device and a first changed password corresponding to authentication of a right to change the first access password, the storage device comprising:
a receiving unit for receiving the first changed password, a second access password, and a second changed password; and
a password management unit for changing the first access password to the second access password and changing the first changed password to the second changed password, when the RFID storage device confirms that the received first changed password is the same as the stored first changed password.

4. The RFID storage device as claimed in claim 3, further comprising an access decision unit for permitting a reader access to the information stored in the storage device upon receiving the second access password from the reader.

5. A radio frequency system that uses a first access password corresponding to permission to access information stored in an RFID storage device and a first changed password corresponding to authentication of a right to change the first access password, the radio frequency system comprising:
a reader for transmitting the first changed password, a second access password, and a second changed password to a storage unit; and
the RFID storage device for changing the first access password to the second access password and changing the first changed password to the second changed password, when the RFID storage device confirms that the received first changed password is the same as a previously stored first changed password that is previously stored at the RFID storage device.

6. The radio frequency system as claimed in claim 5, wherein the storage device permits a second reader access to the information stored in the storage device when the second access password is received from the second reader.

7. A password management method in a radio frequency system, applied to a reader of the radio frequency system that uses a first access password corresponding to permission to access information stored in an RFID storage device and a first changed password corresponding to authentication of a right to change the first access password, the password management method comprising:
receiving a serial number of an RFID storage device;

transmitting the serial number of the RFID storage device to a directory server which stores a uniform resource locator (URL) of an information server that stores information corresponding to the serial number, the first access password, and the first changed password;
receiving the URL of the information server from the directory server;
transmitting the first changed password, a second access password, and a second changed password based on the URL; and
changing the first access password to the second access password and changing the first changed password to the second changed password.

8. The password management method as claimed in claim 7, further comprising:
transmitting the serial number and the second access password based on the URL; and
receiving permission to access the information corresponding to the serial number from an RFID storage device.

9. The password management method as claimed in claim 8, wherein the transmitting of the serial number and the second access password using the URL, comprises:
transmitting an access request signal to the information server and receiving a random number; and
transmitting the serial number and a value obtained by substituting the random number and the first access password in a one-way hash function to the information server.

10. The password management method as claimed in claim 8, wherein the transmitting of the serial number and the second access password using the URL, comprises:
transmitting an access request signal and the serial number to the information server and receiving a random number; and
transmitting a value obtained by substituting the random number and the first access password in a one-way hash function to the information server.

11. The password management method as claimed in claim 8, wherein the transmitting of the serial number and the first access password using the URL comprises transmitting the serial number, a transmission time, and a value obtained by substituting the serial number, the transmission time, and the first access password in a one-way hash function, to the information server.

12. The password management method as claimed in claim 7, wherein the transmitting of the first changed password, the second access password, and the second changed password, comprises:
transmitting a password change request signal to the information server and receiving a random number;
transmitting the serial number and a value obtained by substituting the random number and the first changed password in a one-way hash function; and
transmitting the second access password and the second changed password.

13. A radio frequency system using a first access password corresponding to permission to access information stored in an RFID storage device and a second changed password corresponding to authentication of a right to change the first access password, the radio frequency system comprising:
at least one reader;
at least one RFID storage device;
a receiving unit for receiving a serial number of the storage device; and
a transmitting unit for transmitting the serial number to a directory server which stores a uniform resource locator (URL) of an information server that stores information corresponding to the serial number, the first access password, and a first changed password;
wherein, when the receiving unit receives the URL of the information server, from the directory server, the transmitting unit transmits the serial number, the first changed password, the second access password, and the second changed password to the information server using the URL, and the information server changes the first access password to the second access password and the first changed password to the second changed password.

14. The radio frequency system as claimed in claim 13, wherein the transmitting unit transmits an access request signal to the information server, the receiving unit receives a random number, and the transmitting unit transmits the serial number and a value obtained by substituting the random number and the first access password in a one-way hash function to the information server.

15. The radio frequency system as claimed in claim 13, wherein the transmitting unit transmits an access request signal and the serial number to the information server, the receiving unit receives a random number, and the transmitting unit transmits a value obtained by substituting the random number and the first access password in a one-way hash function to the information server.

16. The radio frequency system as claimed in claim 13, wherein the transmitting unit transmits the serial number, a transmission time, and a value obtained by substituting the serial number, the transmission time, and the first access password in a one-way hash function to the information server.

17. A password management method in a radio frequency system comprising at least one reader, at least one RFID storage device, and an information server for storing information corresponding to a serial number of the RFID storage device, a first access password as corresponding to permission to access information stored in the RFID storage device, and a first changed password corresponding to authentication of a right to change the first access password, the password management method comprising:
receiving, at the at least one RFID storage device, a serial number, the first changed password, a second changed password, and a second access password; and
changing, at the at least one RFID storage device, the first access password to the second access password and the first changed password to the second changed password, when the RFID storage device confirms that the received first changed password is the same as a previously stored first changed password that is previously stored at the at least one RFID storage device.

18. The password management method as claimed in claim 17, further comprising:
receiving the serial number and the second access password from a reader; and
permitting the reader access to information stored in an RFID storage device corresponding to the serial number.

19. The password management method as claimed in claim 18, wherein the receiving of the serial number and the second access password comprises:
receiving an access request signal and transmitting a random number; and
receiving the serial number and a value obtained by substituting the random number and the second access password in a one-way hash function.

20. The password management method as claimed in claim 18, wherein the receiving the serial number and the second access password comprise:
receiving an access request signal and the serial number and transmitting a random number; and
receiving a value obtained by substituting the random number and the second access password in a one-way hash function.

21. The password management method as claimed in claim 18, wherein the receiving of the serial number and the second access password comprises receiving the serial number, a transmission time, and a value obtained by substituting the serial number, the transmission time, and the second access password in a one-way hash function.

22. A radio frequency system comprising at least one reader, at least one RFID storage device, and an information server that stores information corresponding to a serial number of the at least one RFID storage device, a first access password corresponding to permission to access information stored in the RFID storage device, and a first changed password corresponding to authentication of a right to change the first access password, each RFID storage device comprising:
a transmitting and receiving unit for receiving the serial number, the first changed password, a second changed password, and a second access password; and
a password management unit for changing the first access password to the second access password and changing the first changed password to the second changed password, when the RFID storage device confirms that the received first changed password is the same as a previously stored first changed password that is previously stored at the at least one RFID storage device.

23. The radio frequency system as claimed in claim 22, further comprising an access decision unit for determining whether to permit access to information corresponding to the serial number when the RFID storage device determines that the received first changed password is the same as the previously stored first changed password.

24. The radio frequency system as claimed in claim 23, wherein the transmitting and receiving unit receives an access request signal, transmits a random number, and receives the serial number and a value obtained by substituting the random number and the second access password in a one-way hash function.

25. The radio frequency system as claimed in claim 23, wherein the transmitting and receiving unit receives an access request signal and the serial number, transmits a random number, and receives a value obtained by substituting the random number and the second access password in a one-way hash function.

26. The radio frequency system as claimed in claim 23, wherein the transmitting and receiving unit receives the serial number, a transmission time, and a value obtained by substituting the serial number, the transmission time, and the second access password in a one-way hash function.

27. The radio frequency system as claimed in claim 22, wherein the transmitting and receiving unit receives a password change request signal, transmits a random number, receives the serial number and a value obtained by substituting the random number and the first changed password in a one-way hash function, and receives the second access password and the second changed password.

* * * * *